United States Patent
You et al.

(10) Patent No.: US 9,595,386 B2
(45) Date of Patent: Mar. 14, 2017

(54) MULTILAYER CERAMIC ELECTRONIC COMPONENT AND BOARD HAVING THE SAME MOUNTED THEREON

(71) Applicant: SAMSUNG ELECTRO-MECHANICS CO., LTD., Suwon-Si, Gyeonggi-Do (KR)

(72) Inventors: Tae Youl You, Suwon-Si (KR); Dae Bok Oh, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 49 days.

(21) Appl. No.: 14/321,305

(22) Filed: Jul. 1, 2014

(65) Prior Publication Data
US 2015/0075854 A1    Mar. 19, 2015

(30) Foreign Application Priority Data
Sep. 17, 2013    (KR) .................. 10-2013-0111706

(51) Int. Cl.
| | |
|---|---|
| H01G 4/30 | (2006.01) |
| H01G 2/06 | (2006.01) |
| H01G 4/35 | (2006.01) |
| H01G 4/012 | (2006.01) |
| H01G 4/12 | (2006.01) |

(52) U.S. Cl.
CPC ............ *H01G 2/065* (2013.01); *H01G 4/012* (2013.01); *H01G 4/30* (2013.01); *H01G 4/35* (2013.01); *H01G 4/12* (2013.01)

(58) Field of Classification Search
CPC ........................................................ H01G 4/30
USPC .................................................. 361/301–306
See application file for complete search history.

(56) References Cited

U.S. PATENT DOCUMENTS

| | | | | |
|---|---|---|---|---|
| 7,092,236 B2* | 8/2006 | Lee | ........................ | H01G 4/30 361/303 |
| 7,859,821 B2* | 12/2010 | Shimizu | .................. | H01G 4/12 361/303 |
| 8,179,225 B2 | 5/2012 | Iguchi et al. | | |
| 8,194,390 B2* | 6/2012 | Kim | ........................ | H01G 4/01 361/303 |

(Continued)

FOREIGN PATENT DOCUMENTS

| | | |
|---|---|---|
| CN | 101515502 A | 8/2009 |
| CN | 102110528 A | 6/2011 |

(Continued)

OTHER PUBLICATIONS

Korean Office Action issued in Korean Application No. 10-2013-0111706 dated Sep. 1, 2014, with English translation.

(Continued)

*Primary Examiner* — Hoa C Nguyen
*Assistant Examiner* — Stanley Tso
(74) *Attorney, Agent, or Firm* — McDermott Will & Emery LLP

(57) ABSTRACT

A multilayer electronic component is disclosed with a body having a thickness (T) and a width (W) satisfying the equation T/W>1.0, an upper portion of the body including a first and second internal electrodes with an average width of M1 and a lower portion of the body including a first and second internal electrodes with an average width of M2 satisfying M1>M2.

38 Claims, 6 Drawing Sheets

(56) References Cited

U.S. PATENT DOCUMENTS

| | | | |
|---|---|---|---|
| 8,351,180 B1* | 1/2013 | Ahn | H01G 4/30 |
| | | | 361/303 |
| 8,395,882 B2* | 3/2013 | Suzuki | C04B 35/468 |
| | | | 361/321.5 |
| 9,025,307 B2* | 5/2015 | Lim | H01G 4/30 |
| | | | 361/301.4 |
| 9,202,627 B2* | 12/2015 | Shirakawa | H01G 4/30 |
| 2005/0088803 A1 | 4/2005 | Umeda et al. | |
| 2008/0030923 A1 | 2/2008 | Maxwell | |
| 2009/0207554 A1 | 8/2009 | Iguchi et al. | |
| 2011/0157765 A1 | 6/2011 | Kim et al. | |
| 2012/0152604 A1 | 6/2012 | Ahn et al. | |
| 2012/0268875 A1 | 10/2012 | Ahn et al. | |
| 2012/0307418 A1 | 12/2012 | Kim et al. | |
| 2013/0038979 A1 | 2/2013 | Togashi | |
| 2013/0107422 A1 | 5/2013 | Lee et al. | |
| 2013/0135787 A1 | 5/2013 | Lim et al. | |

FOREIGN PATENT DOCUMENTS

| | | |
|---|---|---|
| CN | 102548213 A | 7/2012 |
| JP | 04-329615 A | 11/1992 |
| JP | 09-260184 A | 10/1997 |
| JP | 11-297566 A | 10/1999 |
| JP | 2000-124057 A | 4/2000 |
| JP | 2005-129802 A | 5/2005 |
| JP | 2007-103496 A | 4/2007 |
| JP | 2011-014940 A | 1/2011 |
| JP | 2011-135032 A | 7/2011 |
| JP | 2013-038332 A | 2/2013 |
| KR | 2011-0074259 A | 6/2011 |

OTHER PUBLICATIONS

Extended European Search Report dated May 12, 2015 issued in European Patent Application No. 14275146.0.
Japanese Office Action issued in Application No. 2014-135703 dated Aug. 11, 2015, with English translation.
Chinses Office Action issued in Application No. 201410326571.4 dated Oct. 31, 2016, with English translation.

* cited by examiner

MULTILAYER CERAMIC ELECTRONIC COMPONENT AND BOARD HAVING THE SAME MOUNTED THEREON

CROSS-REFERENCE TO RELATED APPLICATION

This application claims the benefit of Korean Patent Application No. 10-2013-0111706 filed on Sep. 17, 2013, with the Korean Intellectual Property Office, the disclosure of which is incorporated herein by reference.

BACKGROUND

The present disclosure relates to a multilayer ceramic electronic component and a board having the same mounted thereon.

In accordance with the recent trend toward miniaturization of electronic products, a demand for a multilayer ceramic electronic component having a small size and a large capacitance has increased.

Therefore, attempts to thin and stack dielectric layers and internal electrodes have been made by various methods. Recently, as the thicknesses of the dielectric layers have been thinned, multilayer ceramic electronic components in which the number of stacked layers is increased have been manufactured.

As miniaturization of the multilayer ceramic electronic component and thinning of the dielectric layers and the internal electrodes are enabled, the number of stacked layers has been increased in order to implement high capacitance.

As described above, as the miniaturization of the multilayer ceramic electronic component is enabled and the number of stacked layers is increased, the multilayer ceramic electronic component may be manufactured to have an increased thickness as compared with a width thereof, such that high capacitance may be implemented. However, since the dielectric layers have piezoelectric and electrostrictive characteristics, a piezoelectric phenomenon is generated between the internal electrodes when direct current (DC) or alternating current (AC) voltage is applied to a multilayer ceramic capacitor, such that vibrations may be generated.

These vibrations may be transferred to a printed circuit board on which the multilayer ceramic capacitor is mounted through a solder connected to the multilayer ceramic capacitor, such that the entirety of the printed circuit board becomes a sound radiating surface generating a vibration sound, which is noise.

The vibration sound may correspond to an audio frequency range of 20 Hz to 20000 Hz making persons uncomfortable. The vibration sound making the persons uncomfortable as described above may be referred to as acoustic noise.

Therefore, research into a multilayer ceramic electronic component capable of securing high capacitance and decreasing acoustic noise is needed.

RELATED ART DOCUMENT (Patent Document 1) Japanese Patent Laid-Open Publication No. 2005-129802

SUMMARY

An aspect of the present disclosure provides a multilayer ceramic electronic component capable of having high capacitance and reducing acoustic noise, and a board having the same mounted thereon.

According to an aspect of the present disclosure, a multilayer ceramic electronic component includes: a ceramic body including dielectric layers and satisfying T/W>1.0 when a width thereof is W and a thickness thereof is T; and first and second internal electrodes stacked to face each other, having the dielectric layer interposed therebetween, within the ceramic body, wherein when an average width of the first and second internal electrodes stacked at an upper portion of the ceramic body in a thickness direction is M1 and an average width of the first and second internal electrodes stacked at a lower portion of the ceramic body in the thickness direction is M2, M1>M2 is satisfied.

M1 and M2 satisfy $0.85 \leq M2/M1 \leq 0.97$.

When distances from both sides of an internal electrode having a smallest width among the first and second internal electrodes to first and second side surfaces of the ceramic body are a1 and a2, respectively, and distances from both sides of an internal electrode having a largest width among the first and second internal electrodes to the first and second side surfaces of the ceramic body are b1 and b2, respectively, $0.70 \leq (b1+b2)/(a1+a2) \leq 0.93$ is satisfied.

Widths of the first and second internal electrodes may be gradually decreased.

Widths of the first and second internal electrodes may be uniform at the upper portion of the ceramic body in the thickness direction and may be gradually decreased at the lower portion of the ceramic body in the thickness direction.

Widths of the first and second internal electrodes may be decreased while forming a step.

Widths of the first and second internal electrodes may be uniform at the upper portion of the ceramic body in the thickness direction and may be decreased to form a step at the lower portion of the ceramic body in the thickness direction.

Widths of the first and second internal electrodes may be uniform at the upper portion of the ceramic body and part of the lower portion adjacent thereto and may be decreased at a remaining part of the lower portion.

The width and the thickness of the ceramic body satisfy $1.2 \leq T/W \leq 3.0$.

The ceramic body may include a distinguishing part for distinguishing the upper and lower portions of the ceramic body from each other.

The distinguishing part may include a dielectric layer to which at least one metal selected from a group consisting of Ni, Mn, Cr, and V is added.

The distinguishing part may be a mark generated by laser marking.

The dielectric layers may be stacked in an amount of 500 or more layers.

The first and second internal electrodes may be stacked in the thickness direction of the ceramic body.

According to another aspect of the present disclosure, a multilayer ceramic electronic component includes: a ceramic body including dielectric layers, satisfying T/W>1.0 when a width thereof is W and a thickness thereof is T, and having first and second side surfaces opposing each other in a width direction; first and second internal electrodes stacked to face each other, having the dielectric layer interposed therebetween, within the ceramic body; a first side margin part formed between one sides of the first and second internal electrodes in the width direction and the first side surface and including a first acoustic noise decreasing part positioned at a lower portion thereof; and a second side margin part formed between the other sides of the first and second internal electrodes in the width direction and the second side surface and including a second acoustic noise decreasing part positioned at a lower portion thereof.

An average width of the first and second acoustic noise decreasing parts may be wider than that of the first and second side margin parts.

When an average width of the first and second internal electrodes stacked at an upper portion of the ceramic body in a thickness direction is M1 and an average width of the first and second internal electrodes stacked at a lower portion of the ceramic body in the thickness direction is M2, M1>M2 is satisfied.

When an average width of the first and second internal electrodes stacked at an upper portion of the ceramic body in a thickness direction is M1 and an average width of the first and second internal electrodes stacked at a lower portion of the ceramic body in the thickness direction is M2, $0.85 \leq M2/M1 \leq 0.97$ is satisfied.

When distances from both sides of an internal electrode having a smallest width among the first and second internal electrodes to the first and second side surfaces of the ceramic body are a1 and a2, respectively, and distances from both sides of an internal electrode having a largest width among the first and second internal electrodes to the first and second side surfaces of the ceramic body are b1 and b2, respectively, $0.70 \leq (b1+b2)/(a1+a2) \leq 0.93$ is satisfied.

Widths of the first and second internal electrodes may be gradually decreased.

According to another aspect of the present disclosure, a multilayer ceramic electronic component includes: a ceramic body including dielectric layers and satisfying T/W>1.0 when a width thereof is W and a thickness thereof is T; and first and second internal electrodes stacked to face each other, having the dielectric layer interposed therebetween, within the ceramic body, wherein when an average width of the first and second internal electrodes stacked at an upper portion of the ceramic body in a thickness direction is M1 and an average width of the first and second internal electrodes stacked at a lower portion of the ceramic body in the thickness direction is M2, an M2/M1 value is in a range in which acoustic noise is less than 20 dB and a capacitance decrease rate is less than 8%.

According to another aspect of the present disclosure, a board having a multilayer ceramic electronic component mounted thereon, the board includes: a printed circuit board having first and second electrode pads disposed thereon; and the multilayer ceramic electronic component mounted on the printed circuit board, wherein the multilayer ceramic electronic component includes a ceramic body including dielectric layers and satisfying T/W>1.0 when a width thereof is W and a thickness thereof is T, and first and second internal electrodes stacked to face each other, having the dielectric layer interposed therebetween, within the ceramic body, and when an average width of the first and second internal electrodes stacked at an upper portion of the ceramic body in a thickness direction is M1 and an average width of the first and second internal electrodes stacked at a lower portion of the ceramic body in the thickness direction is M2, M1>M2 is satisfied.

According to another aspect of the present disclosure, a board having a multilayer ceramic electronic component mounted thereon, the board includes: a printed circuit board having first and second electrode pads disposed thereon; and the multilayered ceramic electronic component mounted on the printed circuit board, wherein the multilayer ceramic electronic component includes: a ceramic body including dielectric layers, satisfying T/W>1.0 when a width thereof is W and a thickness thereof is T, and having first and second side surfaces opposing each other in a width direction; first and second internal electrodes stacked to face each other, having the dielectric layer interposed therebetween, within the ceramic body; a first side margin part formed between one sides of the first and second internal electrodes in the width direction and the first side surface and including a first acoustic noise decreasing part positioned at a lower portion thereof; and a second side margin part formed between the other sides of the first and second internal electrodes in the width direction and the second side surface and including a second acoustic noise decreasing part positioned at a lower portion thereof.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
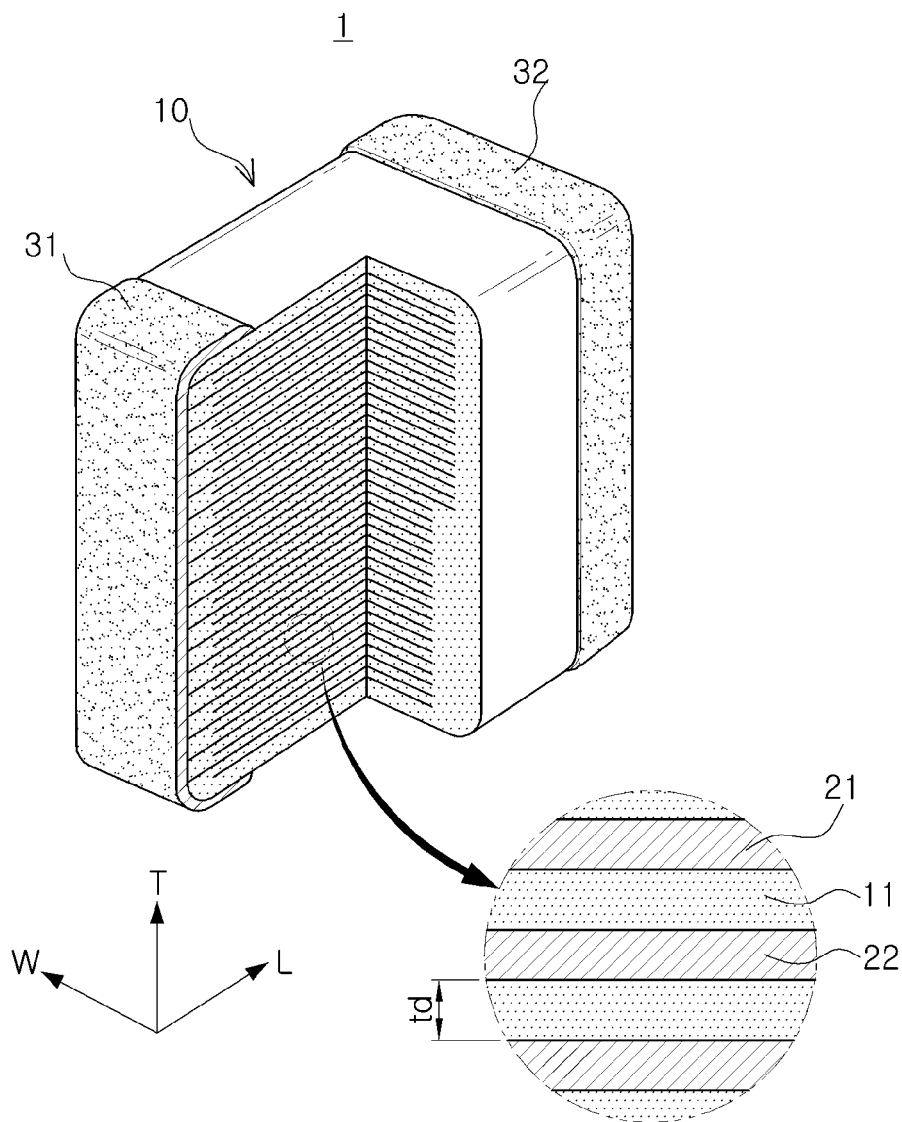
FIG. 1 is a partially cut-away perspective view schematically showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

FIG. 1 is a partially cut-away perspective view schematically showing a multilayer ceramic capacitor according to an exemplary embodiment of the present disclosure.

Figure 2A:
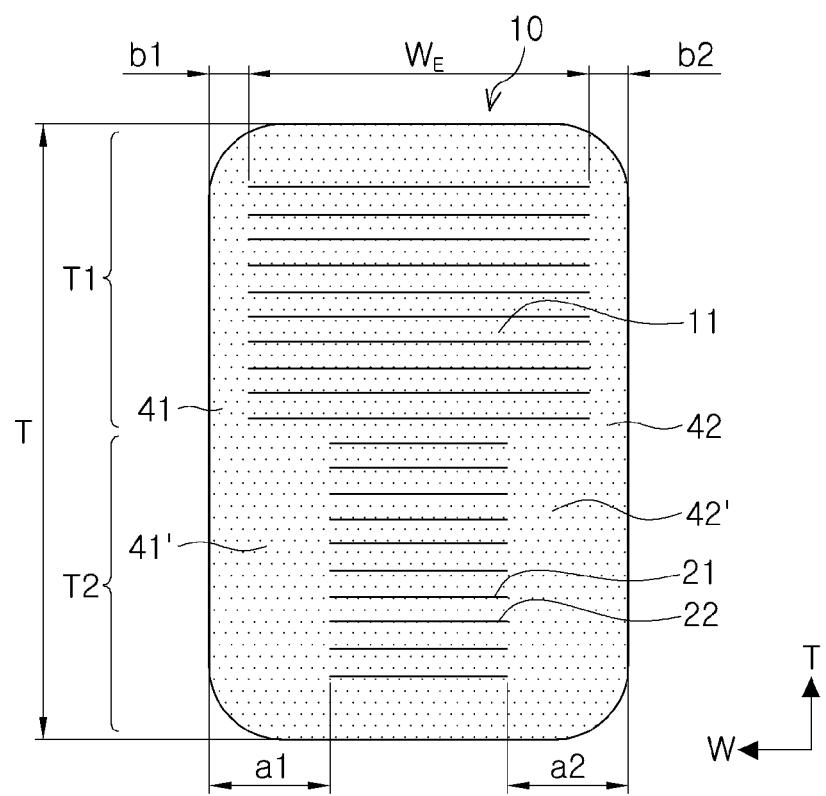
FIGS. 2A through 2G are cross-sectional views of multilayer ceramic capacitors according to exemplary embodiments of the present disclosure, taken in a width-thickness direction.

FIG. 2A is a cross-sectional view of the multilayer ceramic capacitor of FIG. 1, taken in a width-thickness direction.

Referring to FIGS. 1 and 2A, the multilayer ceramic electronic component according to the exemplary embodiment of the present disclosure may include a ceramic body 10 including dielectric layers 11, satisfying the following equation: T/W>1.0 when a width thereof is W and a thickness thereof is T, and having a hexahedral shape; and first and second internal electrodes 21 and 22 stacked to face each other, having the dielectric layer interposed therebetween, within the ceramic body 10, wherein when an average width of the first and second internal electrodes stacked at an upper portion T1 of the ceramic body in a thickness direction is M1 and an average width of the first and second internal electrodes stacked at a lower portion T2 of the ceramic body in the thickness direction is M2, the following equation: M1>M2 is satisfied.

Hereinafter, a multilayer ceramic electronic component according to an exemplary embodiment of the present disclosure, particularly a multilayer ceramic capacitor, will be described. However, the present disclosure is not limited thereto.

A shape of the ceramic body 10 is not particularly limited. For example, the ceramic body 10 may have a hexahedral shape.

In the multilayer ceramic capacitor according to the exemplary embodiment of the present disclosure, a "length direction" refers to an "L" direction of FIG. 1, a "width direction" refers to a "W" direction of FIG. 1, and a "thickness direction" refers to a "T" direction of FIG. 1. Here, the "thickness direction" refers to a direction in which the dielectric layers are stacked, that is, a "stacked direction."

In the exemplary embodiment of the present disclosure, the ceramic body 10 has first and second side surfaces opposing each other in the width direction, first and second end surfaces opposing each other in the length direction, and first and second main surfaces opposing each other in the thickness direction. The first and second main surfaces refer to upper and lower surfaces.

The multilayer ceramic capacitor 1 according to the exemplary embodiment of the present disclosure includes the ceramic body 10 including the dielectric layers 11, satisfying the following equation: T/W>1.0 when a width thereof is W and a thickness thereof is T, and having a hexahedral shape; and the first and second internal electrodes 21 and 22 stacked to face each other, having the dielectric layer 11 interposed therebetween, within the ceramic body 10.

In addition, the ceramic body 10 includes an upper cover layer disposed on the uppermost internal electrode and a lower cover layer disposed below the lowermost internal electrode in order to protect the internal electrodes from external impact. The upper and lower cover layers may be formed of the same material as that of the dielectric layers.

The first and second internal electrodes 21 and 22 are not particularly limited, and, for example, may be formed of a conductive paste formed of at least one selected from a group consisting of a noble metal material such as palladium (Pd), a palladium-silver (Pd—Ag) alloy, or the like, nickel (Ni) and copper (Cu).

The dielectric layer 11 may include ceramic powders having high permittivity, for example, barium titanate (BaTiO$_3$) based powders or strontium titanate (SrTiO$_3$) based powders. However, the present disclosure is not limited thereto.

Meanwhile, the first and second internal electrodes 21 and 22, a pair of electrodes having different polarities, may be formed by printing a conductive paste including a conductive metal on the dielectric layers 11 at a predetermined thickness.

An average thickness of the first and second internal electrodes 21 and 22 after being fired is not particularly limited as long as a capacitance may be generated. For example, the average thickness may be about 0.6 μm or less.

The average thickness of the first and second internal electrodes 21 and 22 may be measured from an image obtained by scanning a cross section of the ceramic body 10 in the width direction using a scanning electron microscope (SEM), as shown in FIG. 2A.

For example, with respect to any internal electrode extracted from an image obtained by scanning a cross section of the ceramic body 10 in a width and thickness (W-T) direction taken along a central portion of the ceramic body 10 in the length (L) direction using the scanning electron microscope (SEM) as shown in FIG. 2A, thicknesses of the dielectric layer may be measured at thirty points disposed at equal intervals in the width direction to calculate an average value thereof.

The thirty points disposed at equal intervals may be measured in a capacitance forming part, which pertains to a region in which the first and second internal electrodes 21 and 22 are overlapped with each other.

In addition, when an average thickness of ten or more internal electrodes is measured, the average thickness of the internal electrodes may be further generalized.

In addition, the first and second internal electrodes 21 and 22 may be alternately exposed through both end surfaces of the ceramic body in a direction in which the dielectric layers 11 are stacked and be electrically insulated from each other by the dielectric layers 11 disposed therebetween.

The first and second internal electrodes 21 and 22 are electrically connected to first and second external electrodes 31 and 32, respectively, through portions thereof alternately exposed through both end surfaces of the ceramic body 10.

Therefore, when voltage is applied to the first and second external electrodes 31 and 32, charges are accumulated between the first and second internal electrodes 21 and 22 facing each other. In this case, the capacitance of the multilayer ceramic capacitor 1 may be proportional to an area of the region in which the first and second internal electrodes 21 and 22 are overlapped with each other.

In order to form the capacitance, the first and second external electrodes 31 and 32 may be formed on an outer portion of the ceramic body 10 and be electrically connected to the first and second internal electrodes 21 and 22, respectively.

The first and second external electrodes 31 and 32 may be formed of the same conductive material as that of the internal electrodes, but are not limited thereto. For example, the first and second external electrodes 31 and 32 may be formed of copper (Cu), silver (Ag), nickel (Ni), or the like.

The first and second external electrodes 31 and 32 may be formed by applying and then firing a conductive paste prepared by adding a glass frit to metal powders.

The ceramic body 10 may be formed by laminating and then firing a plurality of dielectric layers 11. A shape and a dimension of the ceramic body 10 and the number of stacked dielectric layers 11 are not limited to those shown in the present embodiment.

In addition, the plurality of dielectric layers 11 forming the ceramic body 10 may be in a sintered state. Adjacent dielectric layers 11 may be integrated with each other so that boundaries therebetween are not readily apparent without using a scanning electron microscope (SEM).

According to the exemplary embodiment of the present disclosure, an average thickness of the dielectric layers 11 may be arbitrarily altered in accordance with a capacitance design of the multilayer ceramic capacitor 1, but is about 0.1 μm to about 0.6 μm after the dielectric layers 11 are sintered.

The average thickness td of the dielectric layers 11 may be measured from an image obtained by scanning a cross section of the ceramic body 10 in the width direction using a scanning electron microscope (SEM) as shown in FIG. 2A, which may be performed by a method similar to the method of measuring the average thickness of the internal electrodes.

The number of stacked dielectric layers 11 is not particularly limited, but may be, for example, 500 or more.

The number of stacked dielectric layers 11 may be 500 or more, whereby a high capacitance multilayer ceramic capacitor including the ceramic body having a thickness T larger than a width W may be implemented.

Meanwhile, when a width of the ceramic body 10 is W and a thickness thereof is T, the following equation: T/W>1.0 is satisfied.

In the multilayer ceramic capacitor 1 according to the exemplary embodiment of the present disclosure, in which the number of stacked layers is increased in order to implement a high capacitance, the thickness T of the ceramic body 10 is larger than the width W of the ceramic body 10.

A general multilayer ceramic capacitor has been manufactured to have a width and a thickness substantially identical to each other.

However, since the multilayer ceramic capacitor according to the exemplary embodiment of the present disclosure is miniaturized, a sufficient space may be secured when the multilayer ceramic capacitor is mounted on a board. Therefore, the number of stacked layers may be increased in order to implement a high capacitance multilayer ceramic capacitor.

As the number of stacked layers is increased as described above, since the stacked direction in the ceramic body is the thickness direction, a relationship between the thickness T and the width W of the ceramic body 10 satisfy the following equation: T/W>1.0. More appropriately, the ceramic body 10 may be configured to have a ratio of the thickness to the width T/W satisfying the following equation: $1.2 \leq T/W \leq 3.0$.

In a case in which the multilayer ceramic capacitor is manufactured to have the relationship between the thickness T and the width W of the ceramic body satisfying the following equation: T/W>1.0, acoustic noise due to a piezoelectric phenomenon may be further increased when the multilayer ceramic capacitor is mounted on the board.

However, according to the exemplary embodiment of the present disclosure, widths of the internal electrodes and margin parts may be controlled, whereby a multilayer ceramic capacitor having decreased acoustic noise is obtained.

When voltages having different polarities are applied to the first and second external electrodes formed on both end portions of the ceramic body, the ceramic body may be expanded and contracted in the thickness direction by an inverse piezoelectric effect of the dielectric layers 11, and both end portions of the first and second external electrodes may be contracted and expanded as opposed to the expansion and the contraction of the ceramic body in the thickness direction, by a Poisson effect. Vibrations of the multilayer ceramic capacitor caused by the contraction and the expansion of the ceramic body and the first and second external electrodes may be transferred to the board, and the board may become a sound radiating surface of the vibrations to generate noise, which is referred to as acoustic noise.

In the exemplary embodiment of the present disclosure, in order to decrease the acoustic noise, the internal electrodes 21 and 22 may be formed so that when an average width of the first and second internal electrodes stacked at the upper portion T1 of the ceramic body in the thickness direction is M1 and an average width of the first and second internal electrodes 21 and 22 stacked at the lower portion T2 of the ceramic body in the thickness direction is M2, the following equation: M1>M2 is satisfied.

As shown in FIG. 2A, the width of the internal electrode was measured as a distance $W_E$ between both sides of the internal electrode in the width direction.

In the exemplary embodiment of the present disclosure, the upper portion and the lower portion of the ceramic body in the thickness direction may be divided based on a point corresponding to a half of the thickness of the ceramic body.

Widths of the internal electrodes formed at the upper portion and the lower portion of the ceramic body are different from each other, so that distances from the sides of the internal electrodes to the first and second side surfaces of the ceramic body at the upper portion and the lower portion thereof may be different from each other. Therefore, deformation rates at the upper portion and the lower portion of the ceramic body depending on the inverse piezoelectric effect are different from each other, so that the acoustic noise may be decreased. That is, the width of the internal electrode at the lower portion of the ceramic body may be decreased to decrease the deformation rate at the lower portion of the ceramic body. In the case in which the deformation rate at the lower portion of the ceramic body adjacent to the board is decreased, the vibrations transferred to the board are decreased, so that the acoustic noise is decreased.

Particularly, according to the exemplary embodiment of the present disclosure, the width of the internal electrode formed at the upper portion of the ceramic body may be wider than that of the internal electrode formed at the lower portion of the ceramic body, thereby substantially minimizing a capacitance decrease while decreasing the acoustic noise.

More appropriately, M1 and M2 satisfy the following equation: $0.85 \leq M2/M1 \leq 0.97$.

In the case in which M2/M1 exceeds 0.97, a decrease effect of the acoustic noise may not be substantially large, and in the case in which M2/M1 is in the range of 0.85 to 0.97, the acoustic noise is significantly decreased. However, in the case in which M2/M1 is less than 0.85, which is a boundary value, the decrease effect of the acoustic noise may not be significantly improved as compared with the case in which M2/M1 is in the range of 0.85 to 0.97 but a capacitance may be continuously decreased.

Therefore, it advantageous for the internal electrodes to be formed so that M1 and M2 satisfy the following equation: $0.85 \leq M2/M1 \leq 0.97$, in view of minimizing the acoustic noise and the capacitance decrease.

Further, when distances from both sides of an internal electrode having the smallest width among the first and second internal electrodes to the first and second side surfaces of the ceramic body are a1 and a2, respectively, and distances from both sides of an internal electrode having the largest width among the first and second internal electrodes to the first and second side surfaces of the ceramic body are b1 and b2, respectively, the following equation: $0.70 \leq (b1+b2)/(a1+a2) \leq 0.93$ is satisfied.

In the case in which $0.70 \leq (b1+b2)/(a1+a2) \leq 0.93$ is satisfied, the acoustic noise is improved and a target capacitance is secured.

Further, referring to FIG. 2A, a multilayer ceramic electronic component according to an exemplary embodiment of the present disclosure may include a ceramic body 10 including dielectric layers 11, satisfying the following equation: T/W>1.0 when a width thereof is W and a thickness thereof is T, having first and second side surfaces opposing each other in a width direction, and having a hexahedral shape; first and second internal electrodes 21 and 22 stacked to face each other, having the dielectric layer interposed therebetween, within the ceramic body 10; a first side margin part 41 formed between one sides of the first and second internal electrodes in the width direction and the first side surface and including a first acoustic noise decreasing part 41' positioned at a lower portion thereof; and a second side margin part 42 formed between the other sides of the first and second internal electrodes in the width direction and the second side surface and including a second acoustic noise decreasing part 42' positioned at a lower portion thereof.

Widths of the first side margin part formed between one sides of the first and second internal electrodes in the width direction and the first side surface and the second side margin part formed between the other sides of the first and second internal electrodes in the width direction and the second side surface may be controlled to thereby decrease acoustic noise.

Specifically, the first and second side margin parts 41 and 42 may include the acoustic noise decreasing parts 41' and 42' positioned at the lower portions thereof, respectively. Average widths of the acoustic noise decreasing parts may be wider than those of the first and second side margin parts. In other words, the first and second side margin parts may include wide side margin parts (acoustic noise decreasing parts) positioned at the lower portions thereof, to decrease the deformation rate at the lower portion of the ceramic body, thereby decreasing the acoustic noise.

That is, the widths of the side margin parts in a direction perpendicular to a direction in which the first and second internal electrodes are exposed are different from each other to differently control the deformation rates at the upper portion and the lower portion of the ceramic body in a direction in which the internal electrodes are stacked, whereby the acoustic noise is decreased.

FIGS. 2B through 2G are cross-sectional views of multilayer ceramic capacitors according to exemplary embodiments of the present disclosure, taken in a width-thickness direction.

Figure 2B:
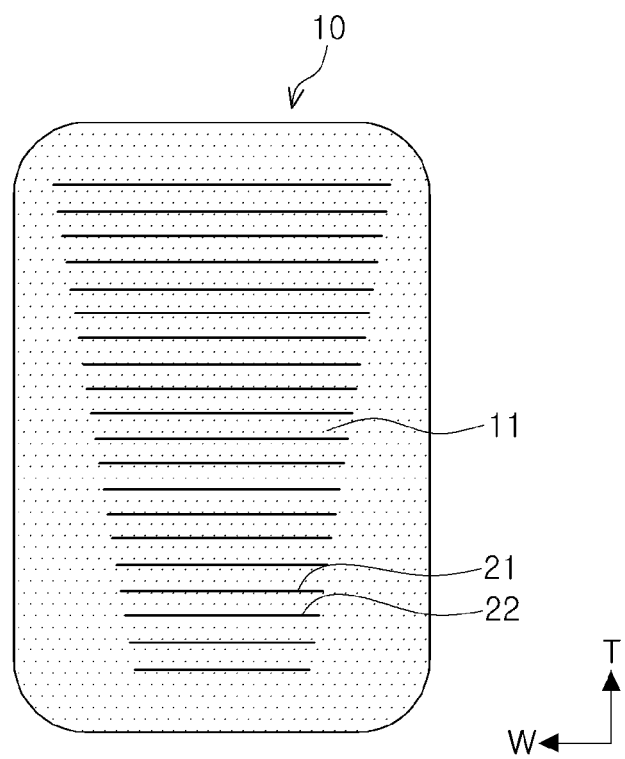

As shown in FIG. 2B, according to an exemplary embodiment of the present disclosure, widths of the first and second internal electrodes 21 and 22 may be gradually decreased from an upper portion of the ceramic body in the stacked direction toward a lower portion thereof. In other words, the entire contour of the internal electrodes represented by a W-T cross section of the ceramic body may have an inverse trapezoidal shape in which the widths thereof are decreased toward the lower portion. When an average width of the first and second internal electrodes stacked at the upper portion of the ceramic body in the thickness direction is M1 and an average width of the first and second internal electrodes stacked at the lower portion of the ceramic body in the thickness direction is M2, in the case in which the widths of the internal electrodes are gradually changed while satisfying the following equation: $0.85 \leq M2/M1 \leq 0.97$, generation of a step due to a difference between the widths of the internal electrodes may be significantly decreased.

Figure 2C:
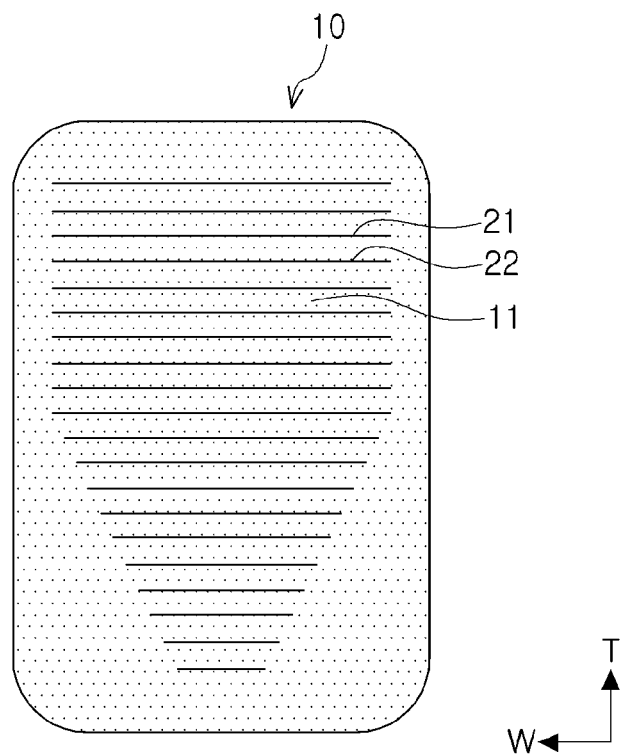

According to an exemplary embodiment of the present disclosure, as shown in FIG. 2C, the first and second internal electrodes 21 and 22 may have uniform widths at the upper portion of the ceramic body and have widths gradually narrowing toward a bottom surface of the ceramic body at the lower portion of the ceramic body.

Figure 2D:
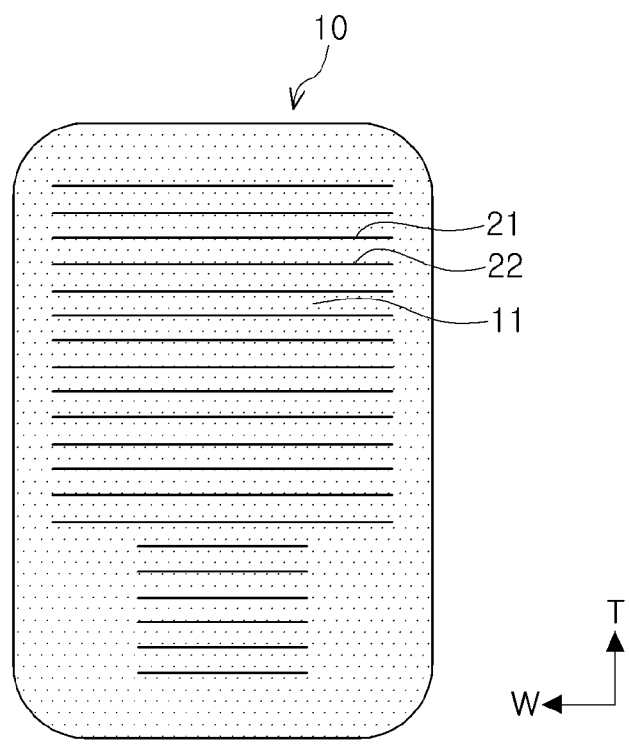

According to an exemplary embodiment of the present disclosure, as shown in FIG. 2D, widths of the first and second internal electrodes 21 and 22 may be relatively wide at the upper portion of the ceramic body and part of the lower portion adjacent thereto, and widths of the first and second internal electrodes 21 and 22 may be relatively narrow at the remaining part of the lower portion of the ceramic body.

Figure 2E:
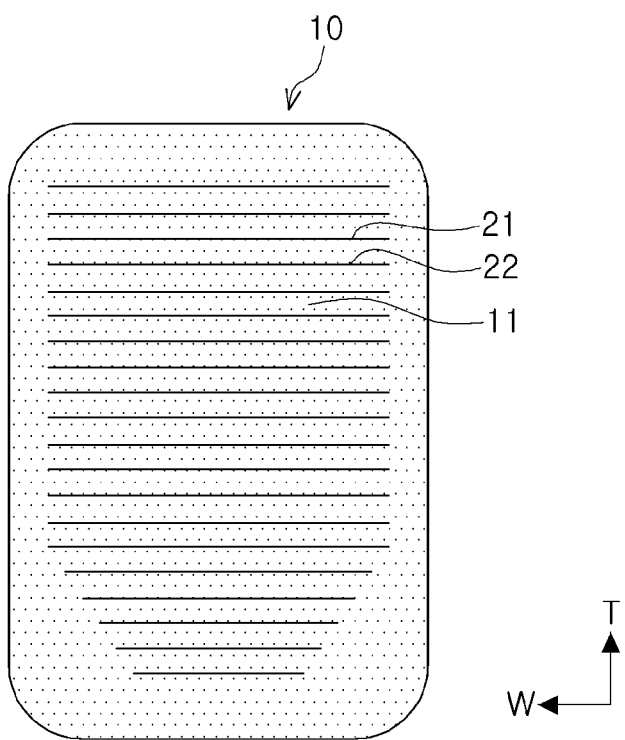

According to an exemplary embodiment of the present disclosure, as shown in FIG. 2E, widths of the first and second internal electrodes 21 and 22 may be relatively wide at the upper portion of the ceramic body and part of the lower portion adjacent thereto, and widths of the first and second internal electrodes 21 and 22 may be relatively narrow at the remaining part of the lower portion of the ceramic body and may gradually become narrower toward the bottom surface of the ceramic body.

Figure 2F:
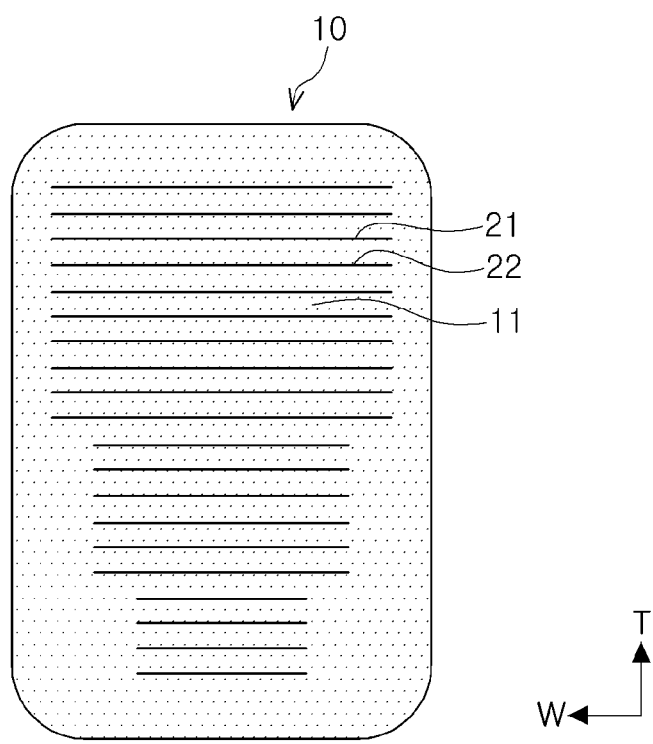

According to an exemplary embodiment of the present disclosure, as shown in FIG. 2F, the first and second internal electrodes 21 and 22 may be relatively wide at the upper portion of the ceramic body, and the first and second internal electrodes 21 and 22 may be relatively narrow at the lower portion of the ceramic body, wherein the widths of the first and second internal electrodes disposed at the lower portion of the ceramic body may become narrower stepwise in two or more sections.

Figure 2G:
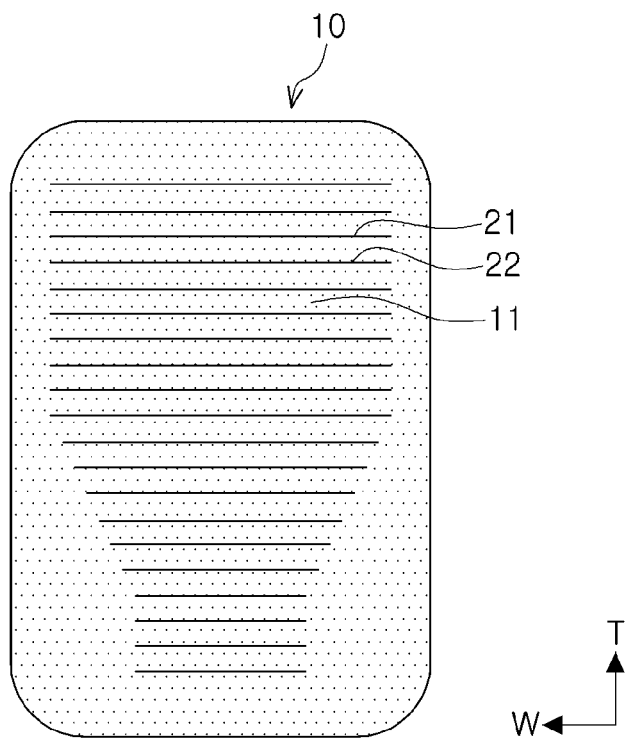

Alternatively, according to an exemplary embodiment of the present disclosure, as shown in FIG. 2G, widths of the first and second internal electrodes 21 and 22 may be uniformly wide at the upper portion of the ceramic body, while widths of the first and second internal electrodes 21 and 22 may be gradually decreased at part of the lower portion of the ceramic body adjacent to the upper portion of the ceramic body, and widths of the first and second internal electrodes 21 and 22 may be uniformly narrow at the remaining part of the lower portion of the ceramic body adjacent to the bottom surface of the ceramic body.

In order for the multilayer ceramic capacitor according to the exemplary embodiment of the present disclosure to be mounted on a board to generate an acoustic noise decrease effect, the multilayer ceramic capacitor needs to be mounted on the board so that the lower portion of the ceramic body at which an average width of the internal electrodes is narrow is adjacent to the board.

Therefore, in order to distinguish the upper portion and the lower portion of the ceramic body, the upper cover layer or the lower cover layer of the ceramic body may include a distinguishing part (not shown) formed of a dielectric layer having a brightness or color difference. According to the exemplary embodiment of the present disclosure, the distinguishing part may be a dielectric layer formed by sintering a single ceramic green sheet or laminating a plurality of ceramic green sheets. The dielectric layer forming the distinguishing part may have a brightness or color difference at an outer portion of the ceramic body 10 by having at least one metal selected from a group consisting of Ni, Mn, Cr, and V added thereto.

Alternatively, laser marking may be performed on the upper cover layer or the lower cover layer to allow a mark or a symbol to remain on the upper cover layer or the lower cover layer even after the ceramic green sheet is sintered, thereby allowing the upper portion and the lower portion of the ceramic body to be distinguished from each other.

According to another exemplary embodiment of the present disclosure, a multilayer ceramic electronic component may include a ceramic body including dielectric layers, satisfying the following equation: $T/W > 1.0$ when a width thereof is W and a thickness thereof is T, and having a hexahedral shape; and first and second internal electrodes stacked to face each other, having the dielectric layer interposed therebetween, within the ceramic body 10, wherein when an average width of the first and second internal electrodes stacked at an upper portion of the ceramic body in a thickness direction is M1 and an average width of the first and second internal electrodes stacked at a lower portion of the ceramic body in the thickness direction is M2, an M2/M1 value is in a range in which acoustic noise is less than 20 dB and a capacitance decrease rate is less than 8%.

Since features of the multilayer ceramic capacitor according to the present embodiment of the present disclosure are the same as those of the multilayer ceramic capacitor according to the above-described embodiment of the present disclosure, a detailed description thereof will be omitted.

Hereafter, although the present disclosure will be described in detail with reference to Examples, it is not limited thereto.

Board Having Multilayer Ceramic Capacitor Mounted Thereon

Figure 3:
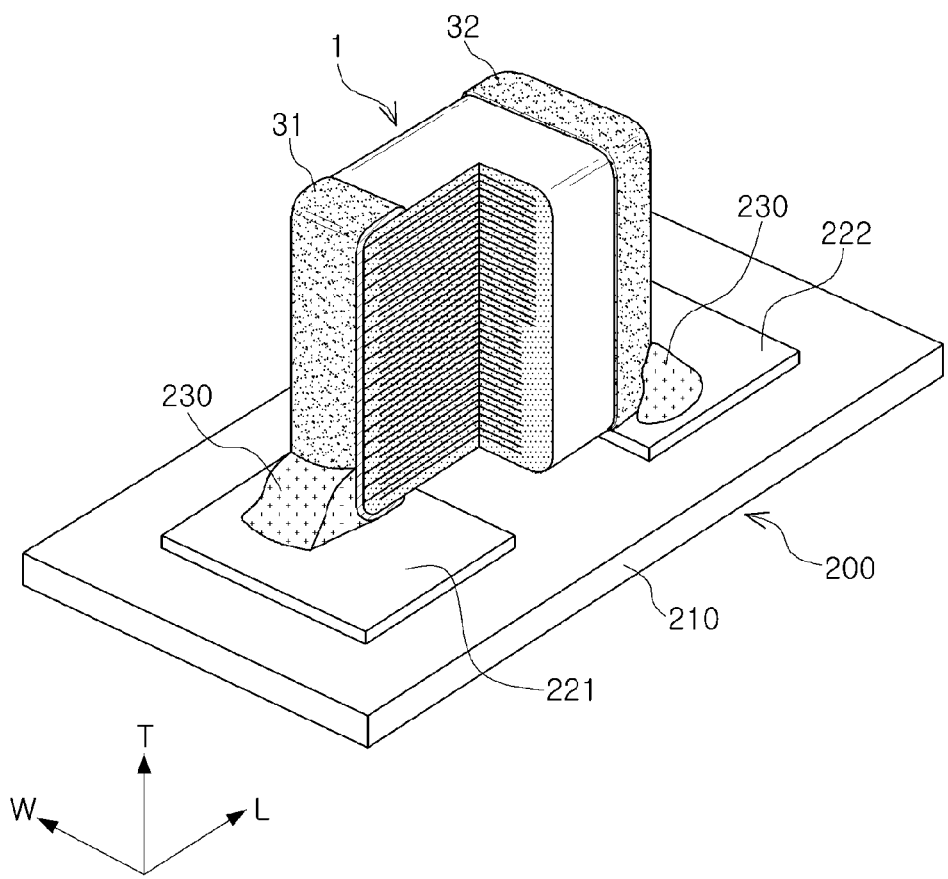
FIG. 3 is a perspective view of a printed circuit board on which the multilayer ceramic capacitor of FIG. 1 is mounted.

FIG. 3 is a perspective view of a printed circuit board on which the multilayer ceramic capacitor of FIG. 1 is mounted.

Referring to FIG. 3, a board 200 having a multilayer ceramic capacitor 1 mounted thereon according to the exemplary embodiment of the present disclosure may include a printed circuit board 210 having the multilayer ceramic capacitor 1 mounted thereon and first and second electrode pads 221 and 222 formed on an upper surface of the printed circuit board 210 so as to be spaced apart from each other.

Here, the first and second external electrodes 31 and 32 of the multilayered ceramic capacitor 1 may be electrically connected to the printed circuit board 210 by a solder 230 in a state in which they contact the first and second electrode pads 221 and 222, respectively.

According to the exemplary embodiment of the present disclosure, a board having a multilayer ceramic electronic component mounted thereon may include a printed circuit board 210 having first and second electrode pads 221 and 222 disposed thereon; and the multilayer ceramic electronic component 1 mounted on the printed circuit board, wherein the multilayer ceramic electronic component includes a ceramic body including dielectric layers, satisfying the following equation: T/W>1.0 when a width thereof is W and a thickness thereof is T, and having a hexahedral shape, and first and second internal electrodes stacked to face each other, having the dielectric layer interposed therebetween, within the ceramic body, and satisfying the following equation: M1>M2 when an average width of the first and second internal electrodes stacked at an upper portion of the ceramic body in a thickness direction is M1 and an average width of the first and second internal electrodes stacked at a lower portion of the ceramic body in the thickness direction is M2.

Further, according to another exemplary embodiment of the present disclosure, a board having a multilayer ceramic electronic component mounted thereon may include a printed circuit board 210 having first and second electrode pads 221 and 222 disposed thereon; and the multilayer ceramic electronic component 1 mounted on the printed circuit board, wherein the multilayer ceramic electronic component includes a ceramic body including dielectric layers, satisfying the following equation: T/W>1.0 when a width thereof is W and a thickness thereof is T, having first and second side surfaces opposing each other in a width direction, and having a hexahedral shape, first and second internal electrodes stacked to face each other, having the dielectric layer interposed therebetween, within the ceramic body, a first side margin part formed between one sides of the first and second internal electrodes in the width direction and the first side surface and including a first acoustic noise decreasing part positioned at a lower portion thereof, and a second side margin part formed between the other sides of the first and second internal electrodes in the width direction and the second side surface and including a second acoustic noise decreasing part positioned at a lower portion thereof.

Here, a description of the same contents as those of the above-described multilayer ceramic capacitor will be omitted in order to avoid a redundant description.

Experimental Example

The Experimental Example was performed in order to test an acoustic noise and whether or not a target capacitance has been implemented in a multilayer ceramic capacitor depending on an M2/M1 value when an average width of first and second internal electrodes stacked at an upper portion of a ceramic body in a thickness direction is M1 and an average width of the first and second internal electrodes stacked at a lower portion of the ceramic body in the thickness direction is M2.

The multilayer ceramic capacitors according to Experimental Examples were manufactured as follows.

First, a slurry including a powder such as a barium titanate ($BaTiO_3$) powder, or the like, having an average particle size of 0.1 μm was applied to carrier films and dried to prepare a plurality of ceramic green sheets having thicknesses of 1.05 μm and 0.95 μm, thereby forming dielectric layers.

Next, a conductive paste for internal electrodes including 40 to 50 parts by weight of a nickel powder having an average particle size of 0.1 μm to 0.2 μm was prepared.

The conductive paste for internal electrodes was applied to the ceramic green sheets by a screen printing method to form internal electrodes, and 500 or more ceramic green sheets were stacked to manufacture a plurality of stacked bodies having different M2/M1 values.

Then, the stacked bodies were compressed and cut to manufacture chips of a 0603 (length×width) size having a ratio of thickness to width exceeding 1, and the chips were sintered at a temperature of 1050° C. to 1200° C. under a reducing atmosphere in which $H_2$ is 0.1% or less.

A polishing process was performed on respective corners and vertices of the chips by a polishing device before the chips were sintered.

Next, processes such as an external electrode forming process, a plating layer forming process, and the like, were performed to manufacture multilayer ceramic capacitors.

The following Table 1 shows the acoustic noise and whether or not the target capacitance has been implemented in a case in which the M2/M1 value changes depending on various shapes of internal electrodes within a ceramic body.

TABLE 1

| Sample | M2/M1 | Acoustic Noise (dB) | Capacitance Decrease Rate (%) | Capacitance Implementation |
|---|---|---|---|---|
| 1* | 0.83 | 15.4 | 8.5 | NG |
| 2* | 0.84 | 15.8 | 8.0 | NG |
| 3 | 0.85 | 15.8 | 7.5 | OK |
| 4 | 0.86 | 16.1 | 7.0 | OK |
| 5 | 0.87 | 16.3 | 6.5 | OK |
| 6 | 0.88 | 16.3 | 6.0 | OK |
| 7 | 0.89 | 16.3 | 5.5 | OK |
| 8 | 0.90 | 16.5 | 5.0 | OK |
| 9 | 0.91 | 16.8 | 4.5 | OK |
| 10 | 0.92 | 17.1 | 4.0 | OK |
| 11 | 0.93 | 17.3 | 3.5 | OK |
| 12 | 0.94 | 17.5 | 3.0 | OK |
| 13 | 0.95 | 17.6 | 2.5 | OK |
| 14 | 0.96 | 17.9 | 2.0 | OK |
| 15 | 0.97 | 18.2 | 1.5 | OK |
| 16* | 0.98 | 20.1 | 1.0 | OK |
| 17* | 0.99 | 23 | 0.5 | OK |

*Comparative Example

In the above Table 1, in the case in which the capacitance decrease rate was equal to or greater than 8%, a target capacitance was not implemented, and thus, capacitance implementation was determined as NG.

Referring to the above Table 1, it may be seen that in Samples 1 and 2, Comparative Examples, the capacitance was not secured, and in Samples 16 and 17, Comparative Examples, the acoustic noise was rapidly increased.

Particularly, in Samples 1 and 2, the acoustic noise was not substantially decreased as compared with the acoustic noise in Sample 3, while only the capacitance was decreased.

On the other hand, it may be seen that in Samples 3 to 15, Inventive examples, in which a numeral range according to the present disclosure was satisfied, the acoustic noise decreased by a large margin while the capacitance decreased by a small amount, so that a high capacitance multilayer ceramic capacitor may be implemented.

Therefore, it may be seen that it is appropriate to manufacture a multilayer ceramic capacitor so that M2/M1, the ratio between the average lengths of upper internal electrodes and lower internal electrodes, satisfies the following equation: $0.85 \leq M2/M1 \leq 0.97$.

As set forth above, according to exemplary embodiments of the present disclosure, a multilayer ceramic capacitor having high capacitance and decreased acoustic noise, and a board having the same mounted thereon may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
a ceramic body including dielectric layers and satisfying T/W>1.0 when a width thereof is W and a thickness thereof is T;
first and second external electrodes; and
first and second internal electrodes alternately stacked to face each other, having the dielectric layer interposed therebetween, within the ceramic body, and electrically connected to the first and second external electrodes, respectively,
wherein M1>M2, where M1 is a width in a width direction of the first and second internal electrodes stacked at an upper portion of the ceramic body in a thickness direction,
wherein widths of the first and second internal electrodes stacked at the upper portion of the ceramic body are the same,
and M2 is a width in a width direction of the first and second internal electrodes stacked at a lower portion of the ceramic body in the thickness direction,
wherein widths of the first and second internal electrodes stacked at the lower portion of the ceramic body are the same,
wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
and wherein a width in the width direction of the first acoustic noise decreasing part is constant in the thickness direction,
a width in the width direction of the second acoustic noise decreasing part is constant in the thickness direction,
a width in the width direction of the remaining portion of the first side margin part not including the first acoustic noise decreasing part is constant in the thickness direction,
and a width in the width direction of the remaining portion of the second side margin part not including the second acoustic noise decreasing part is constant in the thickness direction.

2. The multilayer ceramic electronic component of claim 1, wherein M1 and M2 satisfy $0.85 \leq M2/M1 \leq 0.97$.

3. The multilayer ceramic electronic component of claim 1, wherein when distances from both sides of an internal electrode having a smallest width among the first and second internal electrodes to first and second side surfaces of the ceramic body are a1 and a2, respectively, and distances from both sides of an internal electrode having a largest width among the first and second internal electrodes to the first and second side surfaces of the ceramic body are b1 and b2, respectively, $0.70 \leq (b1+b2)/(a1+a2) \leq 0.93$ is satisfied.

4. The multilayer ceramic electronic component of claim 1, wherein widths of the first and second internal electrodes are gradually decreased.

5. The multilayer ceramic electronic component of claim 1, wherein widths of the first and second internal electrodes are uniform at the upper portion of the ceramic body in the thickness direction and are gradually decreased at the lower portion of the ceramic body in the thickness direction.

6. The multilayer ceramic electronic component of claim 1, wherein widths of the first and second internal electrodes are decreased while forming a step.

7. The multilayer ceramic electronic component of claim 1, wherein widths of the first and second internal electrodes are uniform at the upper portion of the ceramic body in the thickness direction and are decreased to form a step at the lower portion of the ceramic body in the thickness direction.

8. The multilayer ceramic electronic component of claim 1, wherein widths of the first and second internal electrodes are uniform at the upper portion of the ceramic body and part of the lower portion adjacent thereto and are decreased at a remaining part of the lower portion.

9. The multilayer ceramic electronic component of claim 1, wherein the width and the thickness of the ceramic body satisfy $1.2 \leq T/W \leq 3.0$.

10. The multilayer ceramic electronic component of claim 1, wherein the ceramic body includes a distinguishing part for distinguishing the upper and lower portions of the ceramic body from each other.

11. The multilayer ceramic electronic component of claim 10, wherein the distinguishing part includes a dielectric layer to which at least one metal selected from a group consisting of Ni, Mn, Cr, and V is added.

12. The multilayer ceramic electronic component of claim 10, wherein the distinguishing part is a mark generated by laser marking.

13. The multilayer ceramic electronic component of claim 1, wherein the dielectric layers are stacked in an amount of 500 or more layers.

14. The multilayer ceramic electronic component of claim 1, wherein the first and second internal electrodes are stacked in the thickness direction of the ceramic body.

15. The multilayer ceramic electronic component of claim 1, wherein widths of the first and second internal electrodes are uniformly wide at the upper portion of the ceramic body, widths of the first and second internal electrodes are gradually decreased at part of the lower portion of the ceramic body adjacent to the upper portion of the ceramic body, and widths of the first and second internal electrodes are uniformly narrow at the remaining part of the lower portion of the ceramic body.

16. A multilayer ceramic electronic component comprising:
- a ceramic body including dielectric layers, satisfying T/W>1.0 when a width thereof is W and a thickness thereof is T, and having first and second side surfaces opposing each other in a width direction;
- first and second external electrodes;
- first and second internal electrodes alternately stacked to face each other, having the dielectric layer interposed therebetween, within the ceramic body, and electrically connected to the first and second external electrodes, respectively;
- a first side margin part formed between one sides of the first and second internal electrodes in the width direction and the first side surface and including a first acoustic noise decreasing part positioned at a lower portion thereof;
- and a second side margin part formed between the other sides of the first and second internal electrodes in the width direction and the second side surface and including a second acoustic noise decreasing part positioned at a lower portion thereof,
- wherein a width of the first acoustic noise decreasing part is greater than that of the remaining portion of the first side margin part not including the first acoustic noise decreasing part,
- and a width of the second acoustic noise decreasing part is greater than that of the remaining portion of the second side margin part not including the second acoustic noise decreasing part,
- and a width in the width direction of the first acoustic noise decreasing part is constant in the thickness direction,
- a width in the width direction of the second acoustic noise decreasing part is constant in the thickness direction,
- a width in the width direction of the remaining portion of the first side margin part not including the first acoustic noise decreasing part is constant in the thickness direction,
- and a width in the width direction of the remaining portion of the second side margin part not including the second acoustic noise decreasing part is constant in the thickness direction,
- wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99.

17. The multilayer ceramic electronic component of claim 16, wherein an average width of the first and second acoustic noise decreasing parts is wider than that of the first and second side margin parts.

18. The multilayer ceramic electronic component of claim 16, wherein when an average width of the first and second internal electrodes stacked at an upper portion of the ceramic body in a thickness direction is M1 and an average width of the first and second internal electrodes stacked at a lower portion of the ceramic body in the thickness direction is M2, M1>M2 is satisfied.

19. The multilayer ceramic electronic component of claim 16, wherein when an average width of the first and second internal electrodes stacked at an upper portion of the ceramic body in a thickness direction is M1 and an average width of the first and second internal electrodes stacked at a lower portion of the ceramic body in the thickness direction is M2, $0.85 \leq M2/M1 \leq 0.97$ is satisfied.

20. The multilayer ceramic electronic component of claim 16, wherein when distances from both sides of an internal electrode having a smallest width among the first and second internal electrodes to the first and second side surfaces of the ceramic body are a1 and a2, respectively, and distances from both sides of an internal electrode having a largest width among the first and second internal electrodes to the first and second side surfaces of the ceramic body are b1 and b2, respectively, $0.70 \leq (b1+b2)/(a1+a2) \leq 0.93$ is satisfied.

21. The multilayer ceramic electronic component of claim 16, wherein widths of the first and second internal electrodes are gradually decreased.

22. A multilayer ceramic electronic component comprising:
- a ceramic body including dielectric layers and satisfying T/W>1.0 when a width thereof is W and a thickness thereof is T;
- and first and second internal electrodes stacked to face each other, having the dielectric layer interposed therebetween, within the ceramic body,
- wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
- where M1 is a width in a width direction of the first and second internal electrodes stacked at an upper portion of the ceramic body in a thickness direction,
- wherein widths of the first and second internal electrodes stacked at the upper portion of the ceramic body are the same,
- and M2 is a width in a width direction of the first and second internal electrodes stacked at a lower portion of the ceramic body in the thickness direction,
- wherein widths of the first and second internal electrodes stacked at the lower portion of the ceramic body are the same,
- and wherein a width in the width direction of the first acoustic noise decreasing part is constant in the thickness direction,
- a width in the width direction of the second acoustic noise decreasing part is constant in the thickness direction,
- a width in the width direction of the remaining portion of the first side margin part not including the first acoustic noise decreasing part is constant in the thickness direction,
- and a width in the width direction of the remaining portion of the second side margin part not including the second acoustic noise decreasing part is constant in the thickness direction.

23. A board having a multilayer ceramic electronic component mounted thereon, the board comprising:
- a printed circuit board having first and second electrode pads disposed thereon;
- and the multilayer ceramic electronic component mounted on the printed circuit board,
- wherein the multilayer ceramic electronic component includes a ceramic body including dielectric layers and satisfying T/W>1.0 when a width thereof is W and a thickness thereof is T, first and second external electrodes, and first and second internal electrodes alternately stacked to face each other, having the dielectric layer interposed therebetween, within the ceramic body, and electrically connected to the first and second external electrodes, respectively, and M1>M2, where M1 is a width in a width direction of the first and second internal electrodes stacked at an upper portion of the ceramic body in a thickness direction, wherein widths of the first and second internal electrodes stacked at the upper portion of the ceramic body are the same, and M2 is a width in a width direction of the first and second internal electrodes stacked at a lower portion of the ceramic body in the thickness direction, wherein widths of the first and second internal electrodes stacked at the lower portion of the ceramic body are the same, wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99, and wherein a width in the width direction of the first acoustic noise decreasing part is constant in the thickness direction, a width in the width direction of the second acoustic noise decreasing part is constant in the thickness direction, a width in the width direction of the remaining portion of the first side margin part not including the first acoustic noise decreasing part is constant in the thickness direction, and a width in the width direction of the remaining portion of the second side margin part not including the second acoustic noise decreasing part is constant in the thickness direction.

24. A board having a multilayer ceramic electronic component mounted thereon, the board comprising:
a printed circuit board having first and second electrode pads disposed thereon; and the multilayered ceramic electronic component mounted on the printed circuit board, wherein the multilayer ceramic electronic component includes:
a ceramic body including dielectric layers, satisfying T/W>1.0 when a width thereof is W and a thickness thereof is T, and having first and second side surfaces opposing each other in a width direction;
first and second external electrodes;
first and second internal electrodes alternately stacked to face each other, having the dielectric layer interposed therebetween, within the ceramic body, and electrically connected to the first and second external electrodes, respectively;
a first side margin part formed between one sides of the first and second internal electrodes in the width direction and the first side surface and including a first acoustic noise decreasing part positioned at a lower portion thereof; and
a second side margin part formed between the other sides of the first and second internal electrodes in the width direction and the second side surface and including a second acoustic noise decreasing part positioned at a lower portion thereof, and
a width of the first acoustic noise decreasing part is greater than that of the remaining portion of the first side margin part not including the first acoustic noise decreasing part,
and a width of the second acoustic noise decreasing part is greater than that of the remaining portion of the second side margin part not including the second acoustic noise decreasing part, wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99, and wherein a width in the width direction of the first acoustic noise decreasing part is constant in the thickness direction, and a width in the width direction of the first acoustic noise decreasing part is constant in the thickness direction, a width in the width direction of the second acoustic noise decreasing part is constant in the thickness direction, a width in the width direction of the remaining portion of the first side margin part not including the first acoustic noise decreasing part is constant in the thickness direction, and a width in the width direction of the remaining portion of the second side margin part not including the second acoustic noise decreasing part is constant in the thickness direction.

25. A multilayer electronic component comprising: a body with a thickness (T) and a width (W) satisfying T/W>1.0, wherein the body comprises a plurality of internal electrodes disposed horizontally in a thickness direction with dielectric layers interposed therebetween;
wherein M1 is greater than M2 (M1>M2), where M1 is a width in a width direction of the internal electrodes stacked at an upper portion of the body in a thickness direction,
wherein widths of the internal electrodes stacked at the upper portion of the body are the same,
and M2 is a width in a width direction of the internal electrodes stacked at a lower portion of the body in the thickness direction, wherein widths of the internal electrodes stacked at the lower portion of the body are the same,
wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
and wherein a width in the width direction of the first acoustic noise decreasing part is constant in the thickness direction,
a width in the width direction of the second acoustic noise decreasing part is constant in the thickness direction,
a width in the width direction of the remaining portion of the first side margin part not including the first acoustic noise decreasing part is constant in the thickness direction,
and a width in the width direction of the remaining portion of the second side margin part not including the second acoustic noise decreasing part is constant in the thickness direction.

26. The multilayer electronic component of claim 25, wherein M1 and M2 satisfy $0.85 \leq M2/M1 \leq 0.97$.

27. The multilayer electronic component of claim 25, wherein acoustic noise generated by the multilayer electronic component is less than 20 dB while a capacitance decrease rate is less than 8% and greater than 1% with reference to a capacitance decrease rate of another multilayer ceramic electronic component in which M2/M1=0.99.

28. The multilayer electronic component of claim 25, wherein T and W satisfy $1.2 \leq T/W \leq 3.0$.

29. The multilayer electronic component of claim 25, wherein some of the plurality of the internal electrodes have a uniform width and the remaining of the plurality of the internal electrodes have variable widths.

30. The multilayer electronic component of claim 25, wherein the multilayer electronic component comprises 500 or more dielectric layers interposed between the internal electrodes.

31. A multilayer electronic component comprising:
first and second external electrodes;
a body with a thickness (T) and a width (W) satisfying T/W>1.0 and first and second side surfaces in a width direction, wherein the body comprises a plurality of internal electrodes disposed horizontally in a thickness direction with dielectric layers interposed therebetween;
an upper portion of the body comprising first and second internal electrodes with widths of M1 alternately disposed and electrically connected to the first and second external electrodes, respectively,
wherein the upper portion further comprises a side margin formed between one sides of the first and second internal electrodes in the width direction and the first side surface,
wherein the widths of the first and second internal electrodes disposed in the upper portion of the body are the same;
and a lower portion of the body comprising first and second internal electrodes with widths of M2 alternately disposed and electrically connected to the first and second external electrodes, respectively,
wherein the lower portion further comprises a side margin formed between one sides of the first and second internal electrodes in the width direction and the first side surface,
wherein the widths of the first and second internal electrodes disposed in the lower portion of the body are the same,
wherein the side margin of the upper portion of the body is on average narrower in width than the side margin of the lower portion,
wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
and wherein a width in the width direction of the first acoustic noise decreasing part is constant in the thickness direction,
a width in the width direction of the second acoustic noise decreasing part is constant in the thickness direction,
a width in the width direction of the remaining portion of the first side margin part not including the first acoustic noise decreasing part is constant in the thickness direction,
and a width in the width direction of the remaining portion of the second side margin part not including the second acoustic noise decreasing part is constant in the thickness direction.

32. The multilayer electronic component of claim 31, wherein M1 is greater than M2 (M1>M2).

33. The multilayer electronic component of claim 31, wherein M1 and M2 satisfy $0.85 \leq M2/M1 \leq 0.97$.

34. The multilayer electronic component of claim 31, wherein the acoustic noise generated by the multilayer electronic component is less than 20 dB while a capacitance decrease rate is less than 8% and greater than 1% with reference to a capacitance decrease rate of another multilayer ceramic electronic component in which M2/M1=0.99.

35. The multilayer electronic component of claim 31, wherein T and W satisfy $1.2 \leq T/W \leq 3.0$.

36. The multilayer electronic component of claim 31, wherein the multilayer electronic component comprises 500 or more dielectric layers interposed between the internal electrodes.

37. A board having a multilayer electronic component mounted thereon, the board comprising:
a printed circuit board having first and second electrode pads disposed thereon; and the multilayer electronic component mounted on the printed circuit board, wherein the multilayer electronic component comprising:
first and second external electrodes;
a body with a thickness (T) and a width (W) satisfying T/W>1.0, wherein the body comprises a plurality of internal electrodes disposed horizontally in a thickness direction with dielectric layers interposed therebetween;
an upper portion of the body comprising first and second internal electrodes with widths of M1 alternately disposed and electrically connected to the first and second external electrodes, respectively,
wherein the widths of the first and second internal electrodes disposed in the upper portion of the body are the same;
and a lower portion of the body comprising first and second internal electrodes with widths of M2 alternately disposed and electrically connected to the first and second external electrodes, respectively,
wherein the widths of the first and second internal electrodes disposed in the lower portion of the body are the same,
wherein M1 is greater than M2 (M1>M2),
wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
and wherein a width in the width direction of the first acoustic noise decreasing part is constant in the thickness direction,
a width in the width direction of the second acoustic noise decreasing part is constant in the thickness direction,
a width in the width direction of the remaining portion of the first side margin part not including the first acoustic noise decreasing part is constant in the thickness direction,
and a width in the width direction of the remaining portion of the second side margin part not including the second acoustic noise decreasing part is constant in the thickness direction.

38. A board having a multilayer electronic component mounted thereon, the board comprising:
a printed circuit board having first and second electrode pads disposed thereon; and the multilayered electronic component mounted on the printed circuit board, wherein the multilayer electronic component comprising:
first and second external electrodes;
a body with a thickness (T) and a width (W) satisfying T/W>1.0 and a first and second side surfaces in a width direction,
wherein the body comprises a plurality of internal electrodes disposed horizontally in a thickness direction with dielectric layers interposed therebetween;
an upper portion of the body comprising first and second internal electrodes with widths of M1 alternately disposed and electrically connected to the first and second external electrodes, respectively,
wherein the upper portion further comprises a side margin formed between one sides of the first and second internal electrodes in the width direction and the first side surface,
wherein the widths of the first and second internal electrodes disposed in the upper portion of the body are the same; and
a lower portion of the body comprising first and second internal electrodes with widths of M2 alternately disposed and electrically connected to the first and second external electrodes, respectively,
wherein the lower portion further comprises a side margin formed between one sides of the first and second internal electrodes in the width direction and the first side surface,
wherein the widths of the first and second internal electrodes disposed in the lower portion of the body are the same,
wherein the side margin of the upper portion of the body is on average narrower in width than the side margin of the lower portion,
wherein an M2/M1 value is in a range in which acoustic noise is less than 20 dB and a relative capacitance decrease rate is less than 8% and greater than 1% with reference to a capacitance decrease rate of another multilayer ceramic electronic component in which M2/M1=0.99,
and wherein a width in the width direction of the first acoustic noise decreasing part is constant in the thickness direction,
a width in the width direction of the second acoustic noise decreasing part is constant in the thickness direction,
a width in the width direction of the remaining portion of the first side margin part not including the first acoustic noise decreasing part is constant in the thickness direction,
and a width in the width direction of the remaining portion of the second side margin part not including the second acoustic noise decreasing part is constant in the thickness direction.

* * * * *